US011892346B2

(12) United States Patent
Ho et al.

(10) Patent No.: US 11,892,346 B2
(45) Date of Patent: *Feb. 6, 2024

(54) OPTICAL SYSTEM AND METHOD OF MANUFACTURING THE SAME

(71) Applicant: Advanced Semiconductor Engineering, Inc., Kaohsiung (TW)

(72) Inventors: Hsin-Ying Ho, Kaohsiung (TW); Ying-Chung Chen, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 2 days.

This patent is subject to a terminal disclaimer.

(21) Appl. No.: 17/707,802

(22) Filed: Mar. 29, 2022

(65) Prior Publication Data
US 2022/0221332 A1 Jul. 14, 2022

Related U.S. Application Data

(63) Continuation of application No. 16/405,838, filed on May 7, 2019, now Pat. No. 11,287,312.
(Continued)

(51) Int. Cl.
G01J 1/02 (2006.01)
(52) U.S. Cl.
CPC ........... *G01J 1/0209* (2013.01); *G01J 1/0214* (2013.01)
(58) Field of Classification Search
CPC .......... G01J 1/0209; G01J 1/0204; G01J 1/02; G01J 1/0214; G01S 7/481; G01S 7/4811; G01S 7/48113; H05K 1/18; H05K 1/181; H05K 1/185; H05K 1/186; H05K 1/187; H05K 1/188
See application file for complete search history.

(56) References Cited

U.S. PATENT DOCUMENTS 5,391,910 A 2/1995 Fujimura et al.
5,883,988 A 3/1999 Yamamoto et al.
(Continued)

FOREIGN PATENT DOCUMENTS

CN 103730560 A 4/2014
CN 106066305 A 11/2016
(Continued)

OTHER PUBLICATIONS

Non-Final Office Action for U.S. Appl. No. 16/405,838, dated Jun. 23, 2021, 10 pages.
(Continued)

Primary Examiner — John R Lee
(74) Attorney, Agent, or Firm — FOLEY & LARDNER LLP

(57) ABSTRACT

An optical system and a method of manufacturing an optical system are provided. The optical system includes a carrier, a light emitter, a light receiver, a block structure and an encapsulant. The light emitter is disposed on the carrier. The light receiver is disposed on the carrier and physically spaced apart from the light emitter. The light receiver has a light detecting area. The block structure is disposed on the carrier. The encapsulant is disposed on the carrier and covers the light emitter, the light receiver and the block structure. The encapsulant has a recess over the block structure.

6 Claims, 18 Drawing Sheets

Related U.S. Application Data

(60) Provisional application No. 62/669,320, filed on May 9, 2018.

(56) References Cited

U.S. PATENT DOCUMENTS

| | | | |
|---|---|---|---|
| 6,940,590 | B2 | 9/2005 | Colvin, Jr. et al. |
| 8,610,159 | B2 | 12/2013 | Yong et al. |
| 8,946,620 | B2 | 2/2015 | Loong et al. |
| 9,171,830 | B2 | 10/2015 | Tran et al. |
| 9,383,229 | B2 | 7/2016 | Chin et al. |
| 9,506,802 | B2 | 11/2016 | Chu et al. |
| 9,515,059 | B2 | 12/2016 | Tran et al. |
| 9,525,093 | B2 | 12/2016 | Costello et al. |
| 9,746,557 | B2 | 8/2017 | Camarri et al. |
| 9,752,925 | B2 | 9/2017 | Chu et al. |
| 9,911,877 | B2 | 3/2018 | Ho et al. |
| 10,241,088 | B2 | 3/2019 | Theuss et al. |
| 10,436,635 | B2 | 10/2019 | Chiang et al. |
| 11,287,312 | B2 * | 3/2022 | Ho .................. G01J 1/0209 |
| 2005/0067676 | A1 | 3/2005 | Mahadevan et al. |
| 2007/0246645 | A1 | 10/2007 | Wong et al. |
| 2007/0272882 | A1 | 11/2007 | Ishihara et al. |
| 2014/0103378 | A1 | 4/2014 | Lin |
| 2015/0111324 | A1 | 4/2015 | Tu et al. |
| 2015/0241250 | A1 | 8/2015 | Chin et al. |
| 2016/0126403 | A1 | 5/2016 | Tu et al. |
| 2016/0141440 | A1 | 5/2016 | Chun et al. |
| 2016/0146639 | A1 | 5/2016 | Chan |
| 2016/0259056 | A1 | 9/2016 | Heng et al. |
| 2016/0282510 | A1 | 9/2016 | Kwangkaew et al. |
| 2016/0307881 | A1 | 10/2016 | Ho |
| 2018/0188105 | A1 | 7/2018 | Huang |
| 2019/0346305 | A1 | 11/2019 | Ho et al. |
| 2020/0127156 | A1 | 4/2020 | Camarri et al. |
| 2022/0221332 | A1 * | 7/2022 | Ho .................. G01J 1/0209 |

FOREIGN PATENT DOCUMENTS

| | | |
|---|---|---|
| CN | 206223977 U | 6/2017 |
| CN | 107066930 A | 8/2017 |
| TW | 200303984 A | 9/2003 |
| TW | 200524127 A | 7/2005 |
| TW | 201721110 A | 6/2017 |
| TW | 201734413 A | 10/2017 |
| TW | 201735329 A | 10/2017 |

OTHER PUBLICATIONS

Notice of Allowance for U.S. Appl. No. 16/405,838, dated Nov. 19, 2021, 5 pages.

Office Action for corresponding Taiwanese Patent Application No. 108116013, dated Jan. 17, 2022, 8 pages.

Search Report with English translation for corresponding Taiwanese Patent Application No. 108116013, dated Jan. 17, 2022, 2 pages.

Office Action for corresponding Chinese Patent Application No. 201903851249, dated Sep. 22, 2023, 6 pages.

Search Report with English translation for corresponding Chinese Patent Application No. 201903851249, dated Sep. 22, 2023, 4 pages.

Office Action for corresponding Taiwanese Patent Application No. 111125062, dated Sep. 28, 2023, 11 pages.

Search Report with English translation for corresponding Taiwanese Patent Application No. 111125062, dated Sep. 28, 2023, 3 pages.

* cited by examiner

OPTICAL SYSTEM AND METHOD OF MANUFACTURING THE SAME

CROSS-REFERENCE TO RELATED APPLICATIONS

This application is a continuation of U.S. patent application Ser. No. 16/405,838 filed May 7, 2019, now U.S. Pat. No. 11,287,312, which application claims the benefit of and priority to U.S. Provisional Application No. 62/669,320, filed May 9, 2018, the contents of all such applications being incorporated herein by reference in their entirety.

BACKGROUND

1. Technical Field

The present disclosure relates to an optical system, and more particularly to an optical system including a light detector and a block structure.

2. Description of the Related Art

In an optical system (e.g., light scanning sensor, distance finding sensor, background-light sensing system), light emitters (e.g., vertical-cavity surface-emitting LASER (VCSEL) or light emitting diodes (LED)) and/or light detectors are used. In some optical systems, an encapsulant may be implemented to protect the light emitters or the light detectors. However, some of the light emitted by the light emitter may be reflected (e.g., interface reflection or total internal reflection) at a boundary between the encapsulant and air outside the encapsulant, and the reflected light may be received by the light detector to cause an unacceptable cross-talk issue and reduce the signal-noise ratio (SNR) of the optical system.

SUMMARY

In accordance with an aspect of the present disclosure, an optical system includes a carrier, a light emitter, a light receiver, a block structure and an encapsulant. The light emitter is disposed on the carrier. The light receiver is disposed on the carrier and physically spaced apart from the light emitter. The light receiver has a light detecting area. The block structure is disposed on the carrier. The encapsulant is disposed on the carrier and covers the light emitter, the light receiver and the block structure. The encapsulant has a recess over the block structure.

In accordance another aspect of the present disclosure, an optical system includes a carrier, a light emitter, a light receiver, a block structure and an encapsulant. The light emitter is disposed on the carrier. The light receiver is disposed on the carrier and physically spaced apart from the light emitter. The light receiver has a light detecting area on a top surface of the light receiver. The encapsulant is disposed on the carrier and covers the light emitter and at least a portion of the block structure. The block structure is disposed between the light emitter and the light receiver. The block structure has a curved surface. The encapsulant has a recess over the block structure. A distance between a bottom surface of the recess and the carrier is less than a distance between the light detecting area of the light receiver and the carrier.

In accordance another aspect of the present disclosure, a method of manufacturing an optical system includes (a) providing a carrier; (b) disposing a light emitter on the carrier; (c) disposing a light receiver on the carrier, the light receiver physically spaced apart from the light emitter; (d) forming an encapsulant on the carrier to cover the light emitter and the light receiver; and (e) forming a recess on the encapsulant block structure.

Figure 1:
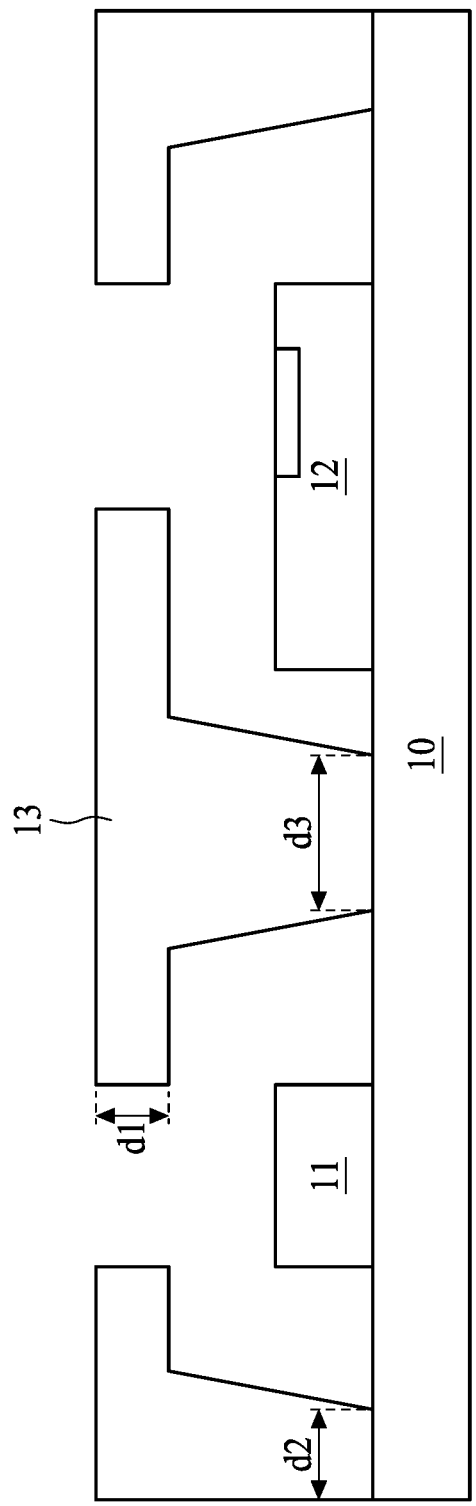
FIG. 1 illustrates a cross-sectional view of an optical system in accordance with some embodiments of the present disclosure.

Common reference numerals are used throughout the drawings and the detailed description to indicate the same or similar components. The present disclosure can be best understood from the following detailed description taken in conjunction with the accompanying drawings.

DETAILED DESCRIPTION

FIG. 1 illustrates a cross-sectional view of an optical system 1. The optical system 1 includes a substrate 10, a light emitter 11, a light detector 12 and a lid 13. As shown in FIG. 1, the lid 13 has a wall structure disposed between the light emitter 11 and the light detector 12. In some embodiments, the lid 13 includes an opaque material to prevent undesired light emitted by the light emitters from being directly transmitted to the light detector. However, since the thickness (e.g., the thickness d1, d2 or d3) of the lid 13 is relatively great (e.g., the lid 13 has a total thickness increase about 0.5 millimeter (mm) in the x-direction or y-direction and a thickness of about 0.4 mm in the z-direction), the use of the lid 13 would hinder the miniaturization of the optical system 1.

Figure 2A:
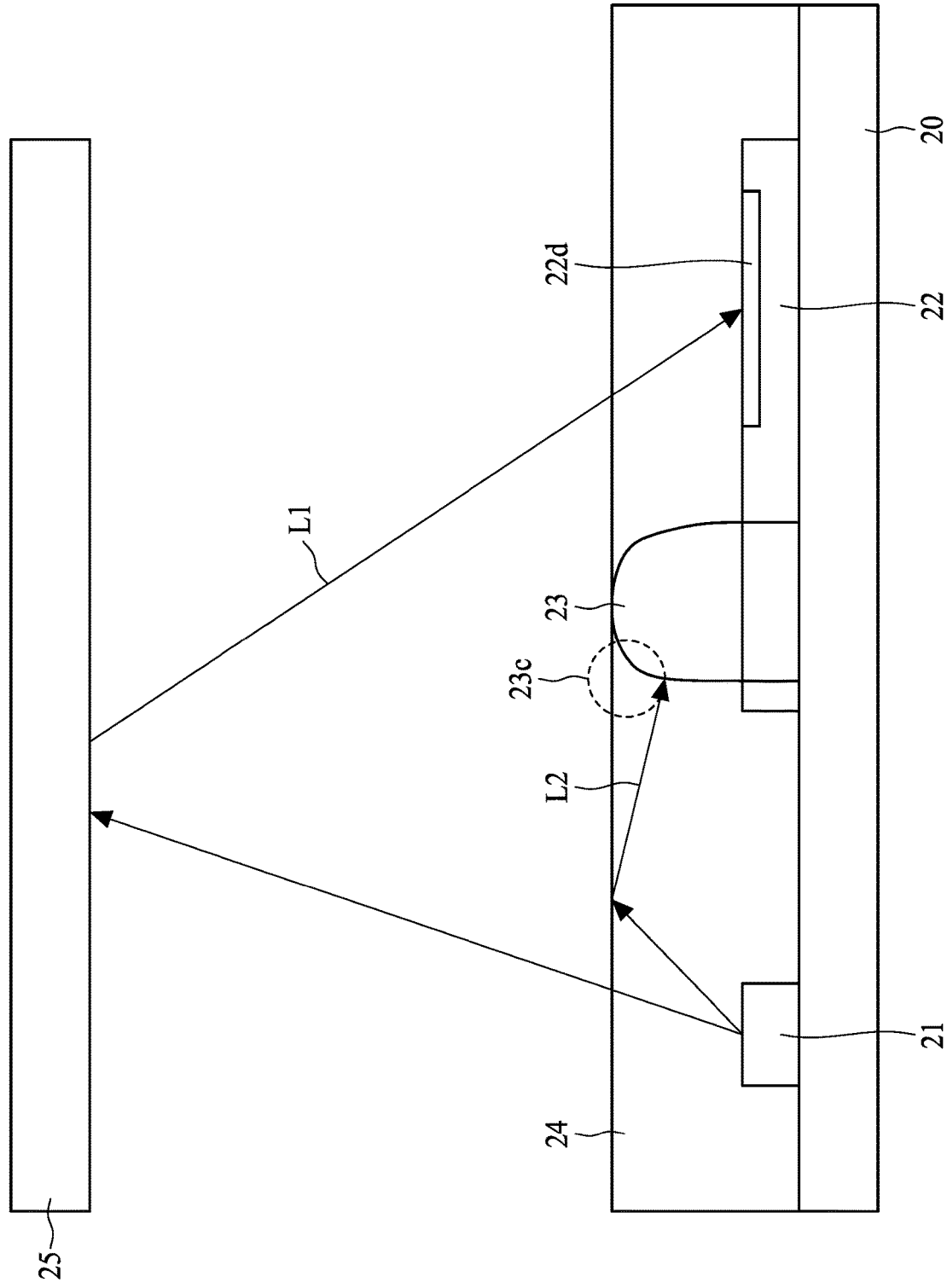
FIG. 2A illustrates a cross-sectional view of an optical system in accordance with some embodiments of the present disclosure.

FIG. 2A illustrates a cross-sectional view of an optical system 2 in some embodiments of the present disclosure. The optical system 2 includes a carrier 20, a light emitter 21, a light receiver 22, a block structure (e.g., dam) 23 and an encapsulant 24.

The carrier 20 may include, for example, a printed circuit board, such as a paper-based copper foil laminate, a composite copper foil laminate, or a polymer-impregnated (p.p.) glass-fiber-based copper foil laminate. The carrier 20 may include an interconnection structure, such as a plurality of conductive traces, pads or through vias. In some embodiments, the carrier 20 includes a ceramic material or a metal plate. In some embodiments, the carrier 20 may include a substrate, such as an organic substrate or a leadframe. In some embodiments, the carrier 20 may include a two-layer substrate which includes a core layer and a conductive material and/or structure disposed on an upper surface and a bottom surface of the carrier. The conductive material and/or structure may include a plurality of traces, pads, or vias.

The light emitter 21 is disposed on the carrier 20. The light emitter 21 may include an emitting die or other optical die. For example, the light emitter 21 may include a light-emitting diode (LED), a laser diode, or another device that may include one or more semiconductor layers. The semiconductor layers may include silicon, silicon carbide, gallium nitride, or any other semiconductor materials. The light emitter 21 can be connected to the carrier 20 by way of flip-chip or wire-bond techniques, for example. In some embodiments, the light emitter 21 includes an LED die bonded on the carrier 20 via a die bonding material. The LED die includes at least one wire-bonding pad. The LED die is electrically connected to the carrier 20 by a conductive wire, one end of which is bonded to the wire-bonding pad of the LED die and another end of which is bonded to a wire-bonding pad of the carrier 20. The light emitter 21 has an active region (or light emitting area) facing away from the carrier 20.

The light receiver 22 is disposed on the carrier 20 and is physically spaced apart from the light emitter 21. In some embodiments, the light receiver 22 includes, for example, a PIN diode (a diode including a p-type semiconductor region, an intrinsic semiconductor region, and an n-type semiconductor region) or a photo-diode or a photo-transistor. In some embodiments, the light receiver 22 detects the light from light emitter 21 and also includes some different sensing area with filter structure for ambient light sensing (ALS). The light receiver 22 can be connected to the carrier 20, for example, by way of flip-chip or wire-bond techniques (e.g., through bonding wires 23$w$). The light receiver 22 has an active region 22$d$ (or light detecting area) facing away from the carrier 20. In some embodiments, the light receiver 22 may include a controller, a processor, a memory, an application-specific integrated circuit (ASIC) and the like.

Figure 2B:
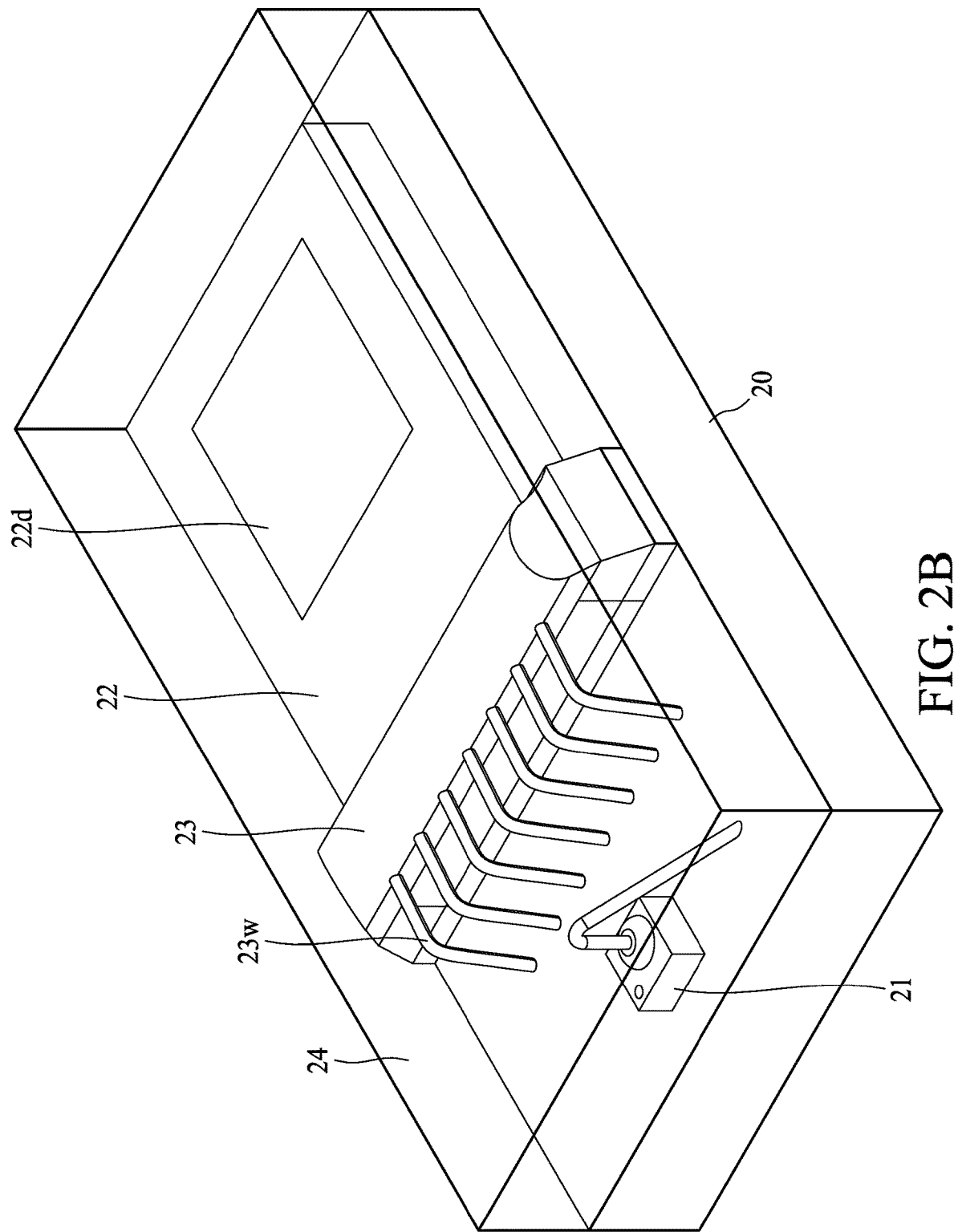
FIG. 2B illustrates a perspective view of an optical system in accordance with some embodiments of the present disclosure.

The block structure (e.g., dam) 23 is disposed on the carrier 20 and across a portion of the light receiver 22 where the light detecting area 22$d$ is not located. For example, the block structure 23 is disposed across other circuits integrated within the light receiver 22. In some embodiments, the block structure 23 may be disposed across a portion of bonding wires 23$w$ connecting the light receiver 22 to the carrier 20 as shown in FIG. 2B, which illustrates a perspective view of the optical system 2 in FIG. 2A. In some embodiments, the block structure 23 may cover a portion of the sidewall of the light receiver 22. In some embodiments, a ratio of a width of a bottom surface of the block structure 23 to a height of the block structure 23 is about 2:1. In some embodiments, the block structure 23 may have a curved structure 23$c$ at or adjacent to a top side of the block structure 23.

In some embodiments, the block structure 23 includes an opaque material or a light absorbing material to prevent the light emitted by the light emitter 21 from being directly transmitted to the light receiver 22. For example, as shown in FIG. 2A, the light L1 detected by the light receiver 22 is reflected by a target object 25, while the light L2 reflected (e.g., interface reflection) at the boundary of the encapsulant 24 and air outside the encapsulant 24 is blocked by the block structure 23. Therefore, the cross-talk issue between the light emitter 21 and the light receiver 22 can be eliminated or mitigated, which can increase the SNR of the optical system 2.

In some embodiments, the power of the light reflected at the boundary of the encapsulant 24 and air outside the encapsulant 24 and received by the light receiver 22 in FIG. 2A or FIG. 2B is about 1% to 5% less than that in an optical system without the block structure. For example, the power of the light reflected at the boundary of the encapsulant 24 and air outside the encapsulant 24 and received by the light receiver 22 in FIG. 2A or FIG. 2B may be about 0.063 micro watt ($\mu$W) with the block structure 23 and may be about 1.68 $\mu$W without the block structure 23. In addition, because no lid is included in the optical system 2 to avoid cross-talk between the light emitter 21 and the light receiver 22, the area and the thickness of the optical system 2 in FIG. 2A or FIG. 2B can be reduced to achieve a compact package size.

The encapsulant 24 is disposed on the carrier 20 and covers the light emitter 21, the light receiver 22 and at least a portion of the block structure 23. In some embodiments, a portion (e.g., a top surface) of the block structure 23 is exposed from the encapsulant 24. The top surface of the block structure 23 is substantially coplanar with a top surface of the encapsulant 24. In other embodiments, the block structure 23 can be fully covered by the encapsulant 24. In some embodiments, the encapsulant 24 includes light transparent materials. For example, the encapsulant 24 is a clear compound. For example, the encapsulant 24 includes an epoxy resin.

Figure 3A:
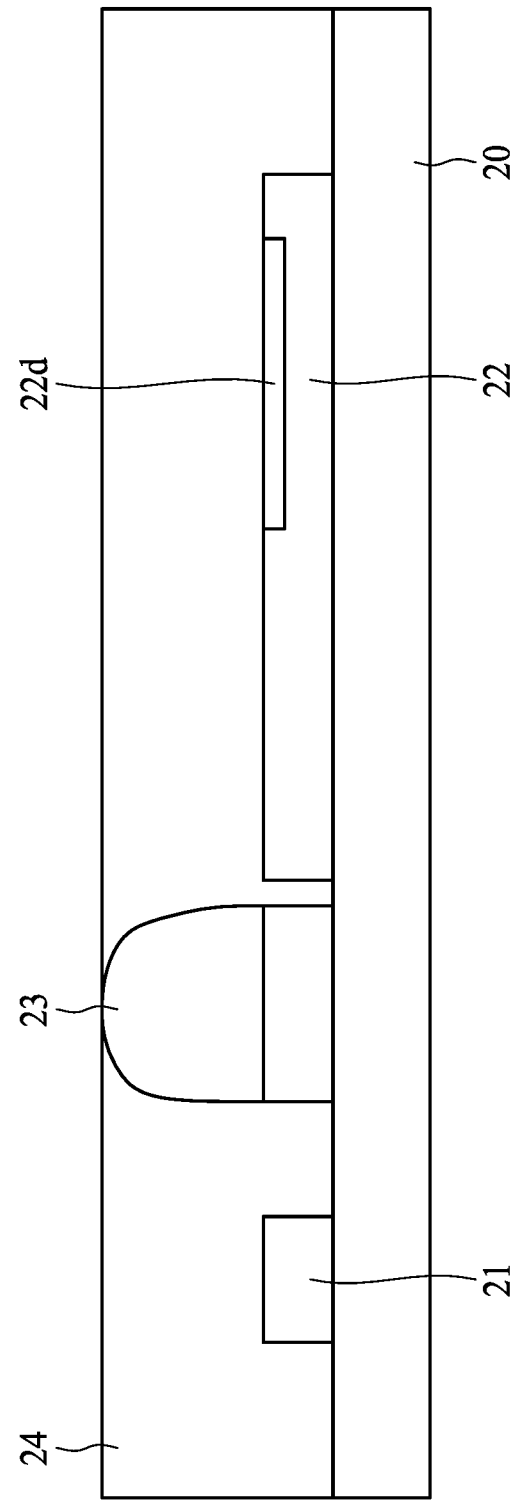
FIG. 3A illustrates a cross-sectional view of an optical system in accordance with some embodiments of the present disclosure.

FIG. 3A illustrates a cross-sectional view of an optical system 3A in some embodiments of the present disclosure. The optical system 3A is similar to the optical system 2 in FIG. 2A except that the block structure 23 in FIG. 3A is not disposed across the light receiver 22. For example, the block structure 23 is disposed between the light emitter 21 and the light receiver 22 and spaced apart from the light emitter 21 or the light receiver 22.

Figure 3B:
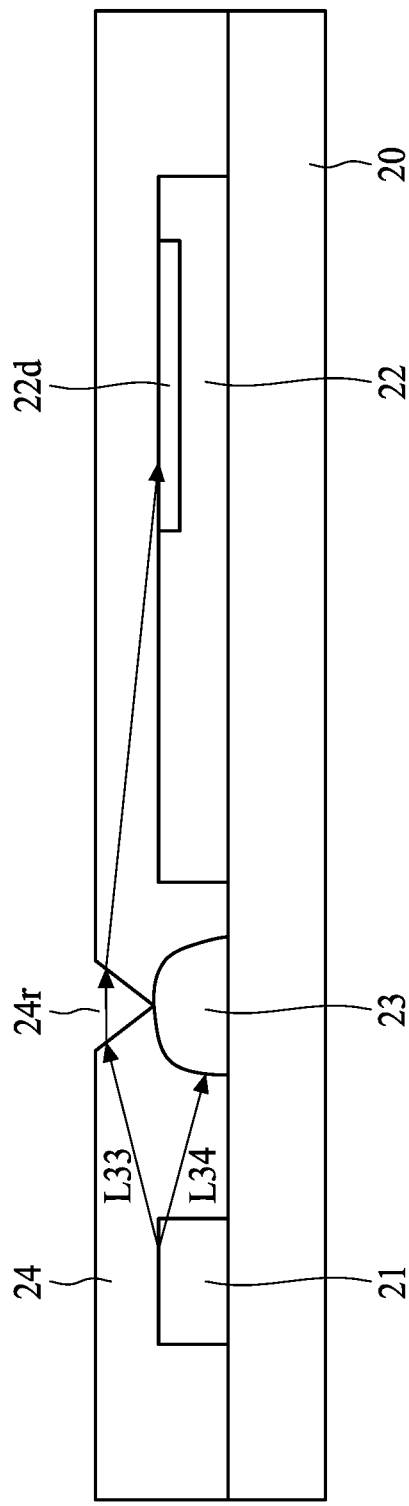
FIG. 3B illustrates a cross-sectional view of an optical system in accordance with some embodiments of the present disclosure.

FIG. 3B illustrates a cross-sectional view of an optical system 3B in some embodiments of the present disclosure. The optical system 3A is similar to the optical system 3A in FIG. 3A, and the differences therebetween are described below.

As shown in FIG. 3B, the encapsulant 24 has a recess 24$r$. The recess is disposed between the light emitter 21 and the light receiver 22. The recess 24$r$ is disposed over the block structure 23. In some embodiments, the recess 24$r$ exposes the block structure 23. In other embodiments, a lower side (e.g., a bottom surface or a bottom side) of the recess 24$r$ is spaced apart from the block structure 23. In some embodiments, the lower side of the recess 24$r$ may be lower than, equal to or greater than the active region 22$d$ of the light receiver 22 depending on different design specifications.

In some embodiments, the light receiver 22 is electrically connected to the carrier 20 through the bonding wires 23. Due to the space (e.g., wireloop) specified for the bonding wires 23, a thickness of the encapsulant 24 has a minimum limitation. For example, there should be a gap between the top surface of the encapsulant 24 and the light receiver 22 for accommodating the bonding wires 23. In addition, as mentioned above, a ratio of the width of the bottom surface of the block structure 23 to the height of the block structure 23 should follow a rule (e.g., 2:1), and thus if the height of the block structure 23 is designed to be the same as the thickness of the encapsulant 24, the width of the block structure 23 would be relatively large, which will increase the area (increase package size) occupied by the block structure 23. However, if the height of the block structure 23 is designed to be less than the thickness of the encapsulant 24 (e.g., a gap exists between the top surface of the encapsulant 24 and the top surface of the block structure 23), the light emitted from the light emitter 21 may directly enter the light receiver 22, which would cause an unacceptable cross-talk issue and reduce the SNR.

In accordance with the embodiments as shown in FIG. 3B, the recess 24r is formed over the block structure 23, the light (e.g., L33) emitted by the light emitter 21 may be refracted twice by the recess 24r, in which one refraction occurs when the light emitted from the encapsulant 24 to the outside of the encapsulant 24, and the other refraction occurs when the light emitted from the outside of the encapsulant 24 to the encapsulant 24. Thus, the power of the light emitted by the light emitter 21 and directly entering the active region 22d of the light receiver 22 can be reduced. For example, the power of the light emitted by the light emitter 21 and directly entering the active region 22d of the light receiver 22 as shown in the structure of FIG. 3B may be 80% less than that of the structure without the recess. Therefore, by forming the recess 24r over the block structure 23, the power of the light emitted by the light emitter 21 and directly entering the active region 22d of the light receiver 22 can be reduced without increasing the height of the block structure 23. In addition, the block structure 23 includes an opaque material or a light absorbing material to prevent the light emitted by the light emitter 21 from being directly transmitted to the light receiver 22 (e.g., through the path L34).

Figure 3C:
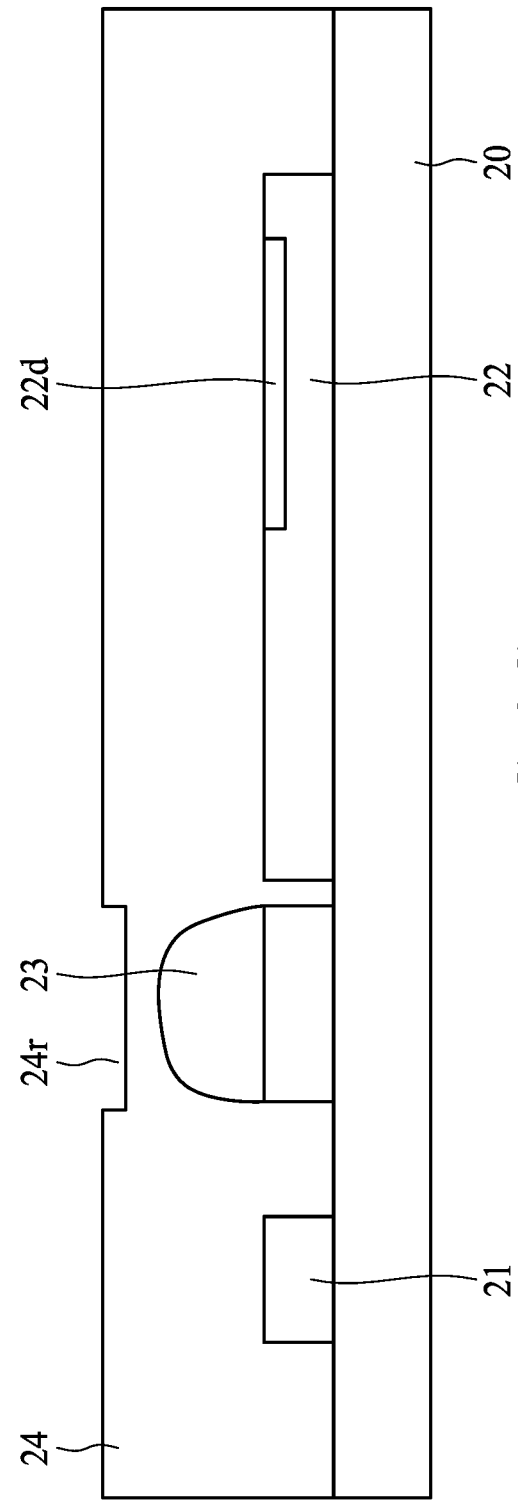
FIG. 3C illustrates a cross-sectional view of an optical system in accordance with some embodiments of the present disclosure.

FIG. 3C illustrates a cross-sectional view of an optical system 3C in some embodiments of the present disclosure. The optical system 3C is similar to the optical system 3B in FIG. 3B, except that the shape of the recess 24r in FIG. 3C is different from that of the recess 24r in FIG. 3B. In some embodiments, the shape of the recess 24r can be designed depending on different design specifications. In some embodiments, a bottom surface of the recess 24r is spaced apart from the block structure 23. For example, there is a gap between the recess 24r and the block structure 23.

Figure 3D:
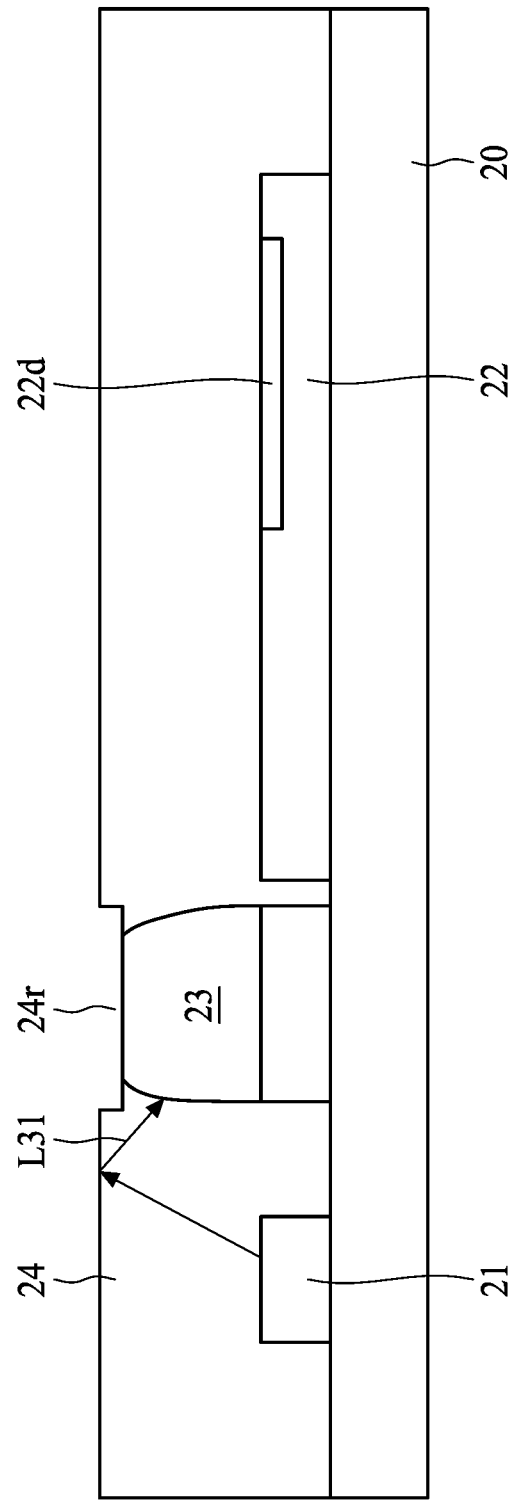
FIG. 3D illustrates a cross-sectional view of an optical system in accordance with some embodiments of the present disclosure.

FIG. 3D illustrates a cross-sectional view of an optical system 3D in some embodiments of the present disclosure. The optical system 3D in FIG. 3D is similar to the optical system 3A in FIG. 3A except that the encapsulant 24 of the optical system 3D in FIG. 3D has a recess 24r to expose a top surface of the block structure 23. For example, a top surface of the encapsulant 24 is not coplanar with the top surface of the block structure 23. In some embodiments, a hardness of the block structure 23 in FIG. 3D is greater than a hardness of the block structure 23 in FIG. 2A or FIG. 3A. In some embodiments, a bottom surface of the recess 24r is substantially coplanar with a top surface of the block structure 23. For example, the top surface of the block structure 23 is exposed from the recess 24r. In some embodiments, a width of the recess 24r may be equal to or greater than a width of the block structure 23.

Compared with the optical system 3C in FIG. 3C, the top surface of the block structure 23 in FIG. 3D is exposed from the recess, which may prevent the light emitted by the light emitter 21 from being directly transmitted to the light receiver 22. For example, as shown in FIG. 3D, the light L31 reflected (e.g., interface reflection) at the boundary of the encapsulant 24 and air outside the encapsulant 24 is blocked by the block structure 23. Therefore, the cross-talk issue between the light emitter 21 and the light receiver 22 can be eliminated or mitigated, which can increase the SNR of the optical system 3D.

Figure 3E:
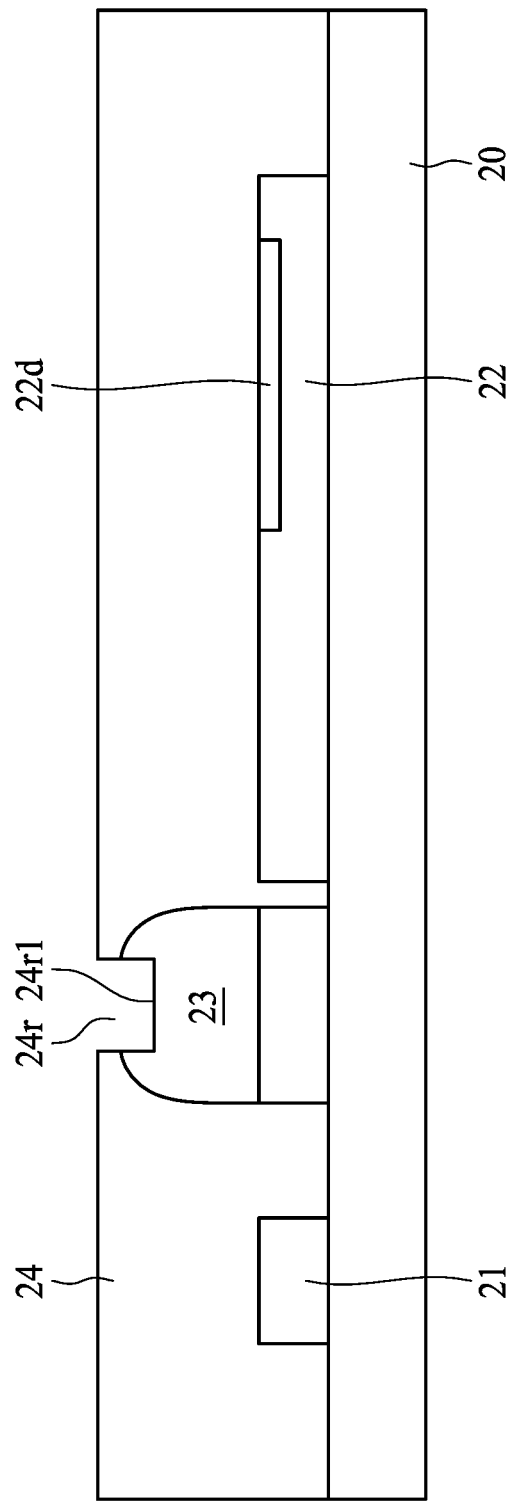
FIG. 3E illustrates a cross-sectional view of an optical system in accordance with some embodiments of the present disclosure.

FIG. 3E illustrates a cross-sectional view of an optical system 3E in some embodiments of the present disclosure. The optical system 3E in FIG. 3E is similar to the optical system 3D in FIG. 3D and the differences therebetween are described below.

In some embodiments, the width of the recess 24r in FIG. 3E is less than the width of the block structure 23. As shown in FIG. 3E, the block structure 23 may have a cutting surface 24r1 that is exposed from the encapsulant 24. The cutting surface 24r1 of the block structure 23 is recessed from the other portion of the block structure 23 surrounding the cutting surface 24r1. In some embodiments, the recess 24r may be defined by the cutting surface 24r1 and at least a portion of the block structure 23. The example, at least a portion of a sidewall of the recess 24r may be defined by a portion the block structure 23. In some embodiments, the portion of the block may at least partially surround the cutting surface 24r1 and exposed from the encapsulant 24.

Figure 4:
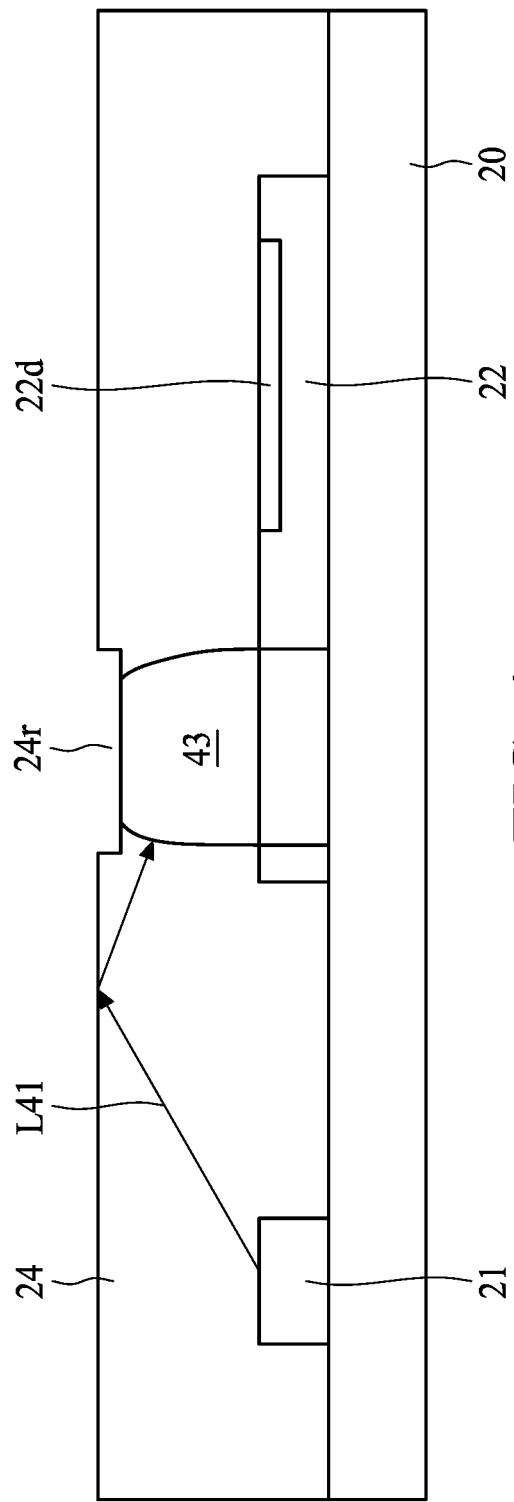
FIG. 4 illustrates a cross-sectional view of an optical system in accordance with some embodiments of the present disclosure.

FIG. 4 illustrates a cross-sectional view of an optical system 4 in some embodiments of the present disclosure. The optical system 4 in FIG. 4 is similar to the optical system 2 in FIG. 2A except that the encapsulant 24 of the optical system 4 in FIG. 4A has a recess 24r to expose a top surface of the block structure 43. For example, a top surface of the encapsulant 24 is not coplanar with the top surface of the block structure 43.

As shown in FIG. 4, the light L41 reflected (e.g., interface reflection) at the boundary of the encapsulant 24 and air outside the encapsulant 24 is blocked by the block structure 23. Therefore, the cross-talk issue between the light emitter 21 and the light receiver 22 can be eliminated or mitigated, which can increase the SNR of the optical system 4. In some embodiments, the power of the light reflected at the boundary of the encapsulant 24 and air outside the encapsulant 24 and received by the light receiver 22 may be about 0.028 µW.

Figure 5A:
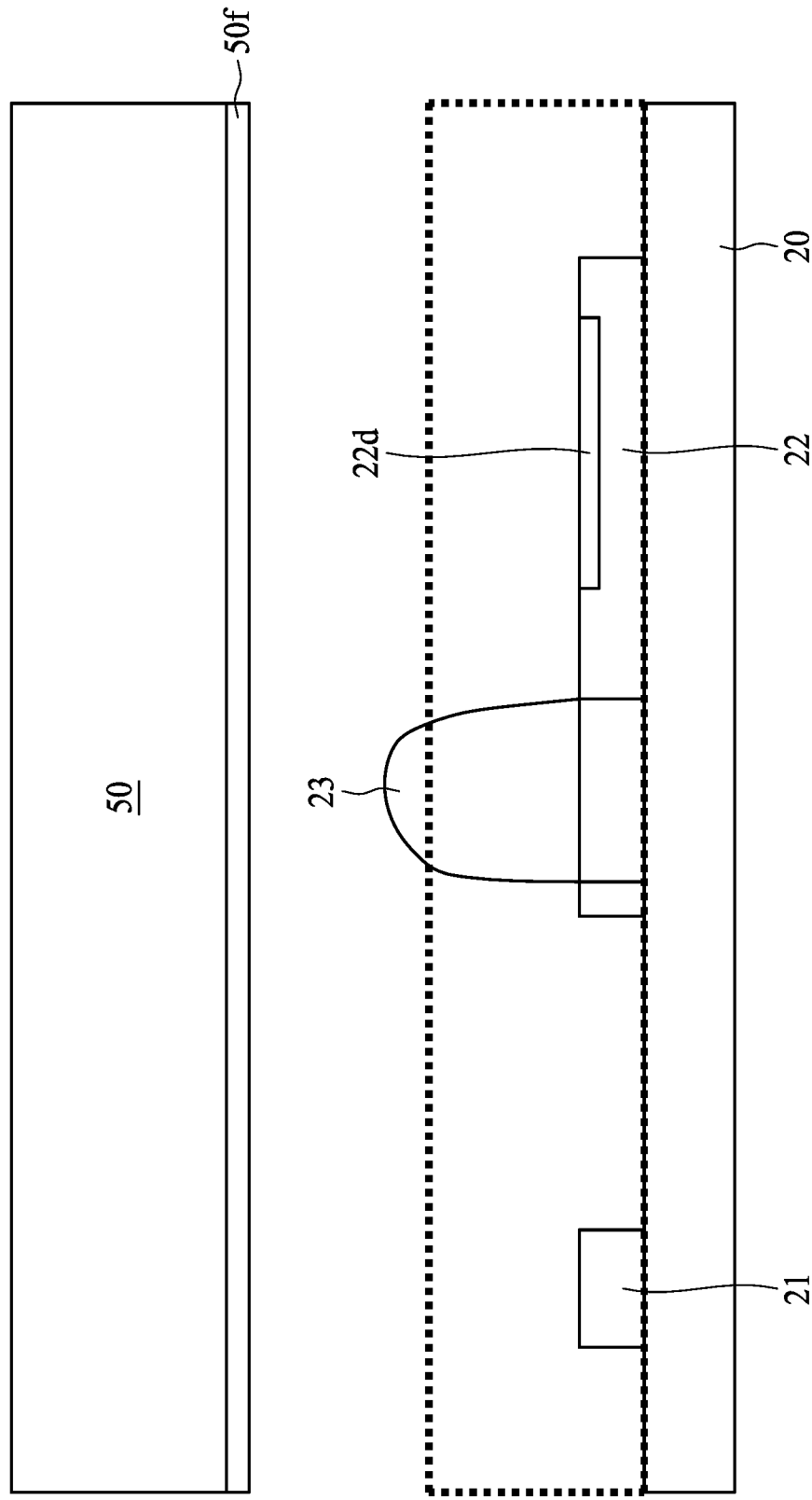
FIG. 5A and FIG. 5B illustrate a method for manufacturing an optical system in accordance with some embodiments of the present disclosure.
Figure 5B:
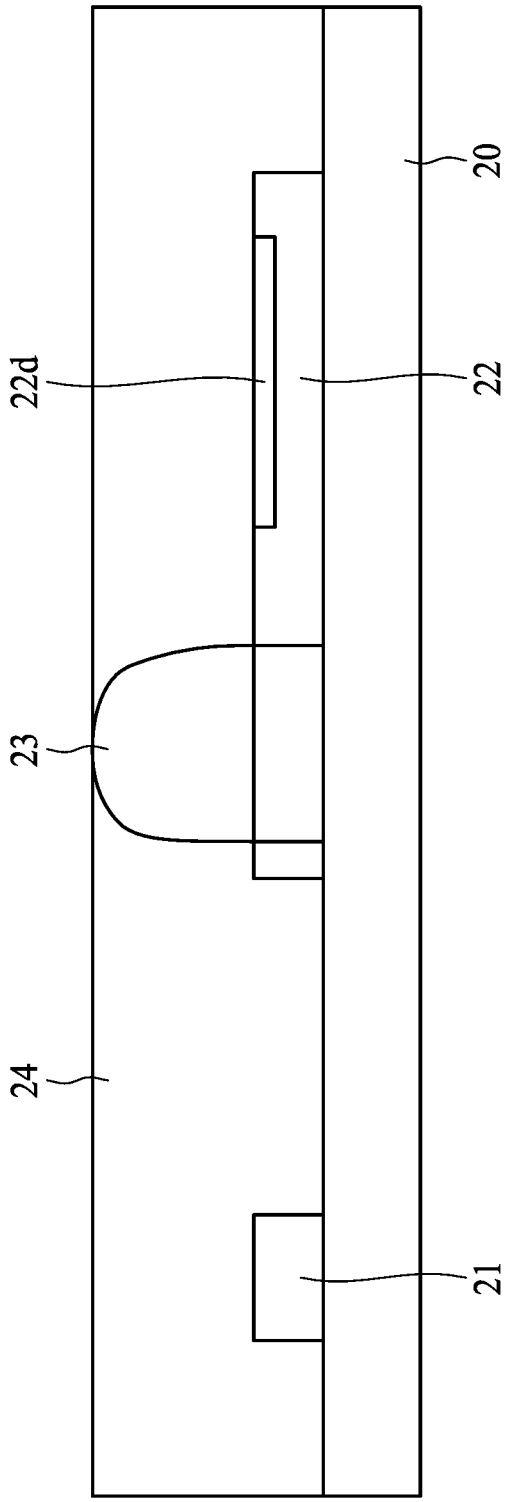

FIG. 5A and FIG. 5B illustrate a method of manufacturing an optical system in accordance with some embodiments of the present disclosure. In some embodiments, the method in FIG. 5A and FIG. 5B are used to manufacture the optical system 2 in FIG. 2A.

Referring to FIG. 5A, a carrier 20 is provided. A light emitter 21 and a light receiver 22 are disposed on the carrier 20 and physically spaced apart from each other. A block structure 23 is formed on the carrier 20 and across a portion of the light receiver 22 where the light detecting area 22d is not located. In some embodiments, the block structure 23 can be formed by dispensing opaque materials on the carrier 20 and the portion of the light receiver 22 where the light detecting area 22d is not located. In some embodiments, the block structure 23 includes silicon, epoxy or any other suitable materials (e.g., opaque materials or light absorbing materials). In some embodiments, the block structure 23 is relatively soft or flexible. For example, the block structure 23 can be formed of a material of Shore A50 or greater hardness.

A mold tool 50 with a film 50f then moves toward the carrier 20 to form the encapsulant 24 to cover the light emitter 21, the light receiver 22 and the block structure 23 to form the optical system 2 as shown in FIG. 5B. In some embodiments, the molding compound 24 is formed by compressive molding process. Since the support structure 23 is relatively soft or flexible, the block structure 23 would be compressed when pressing the mold tool 50 on the block structure 23. Hence, there is no clearance between the top surface of the block structure 23 and the top surface of the encapsulant 24. In other words, the top surface of the block structure 23 is substantially coplanar with the top surface of the encapsulant 24.

Figure 6A:
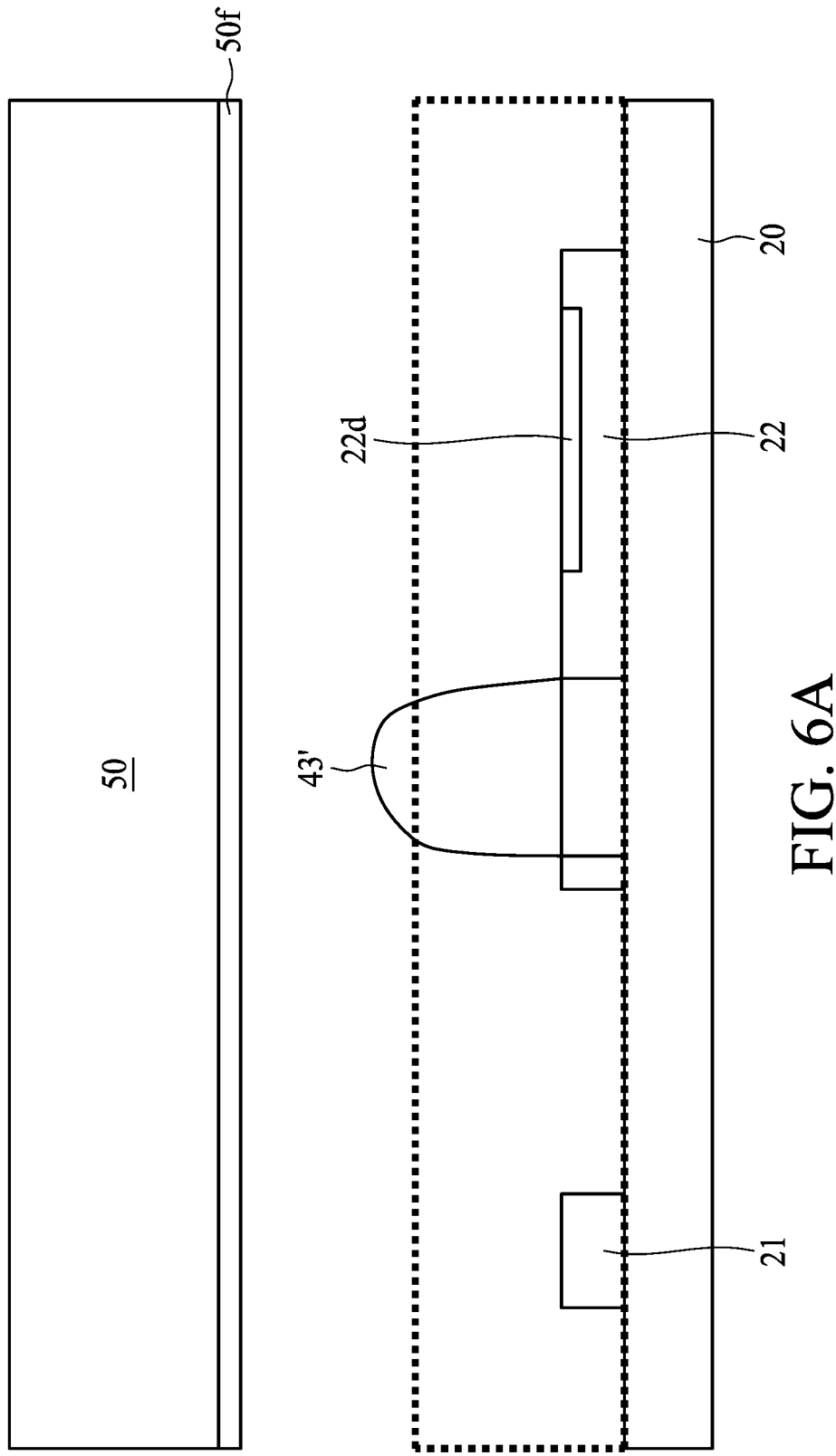
FIG. 6A, FIG. 6B and FIG. 6C illustrate a method for manufacturing an optical system in accordance with some embodiments of the present disclosure.
Figure 6B:
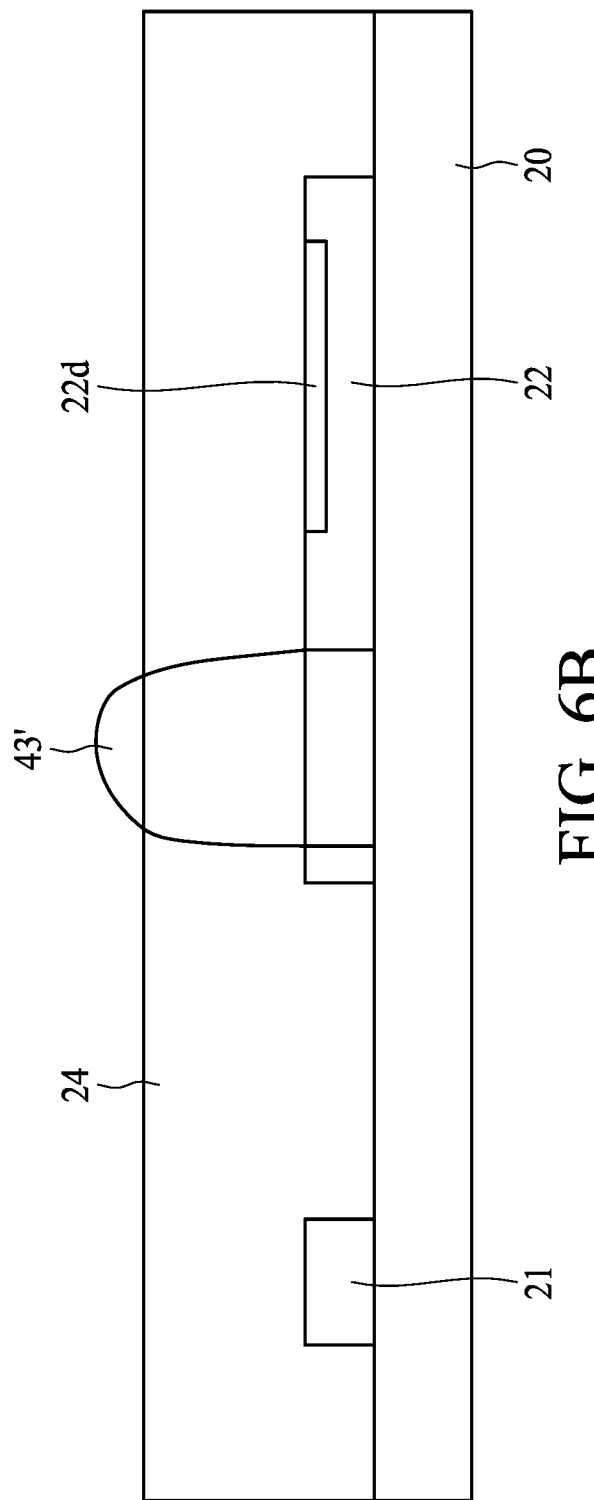
Figure 6C:
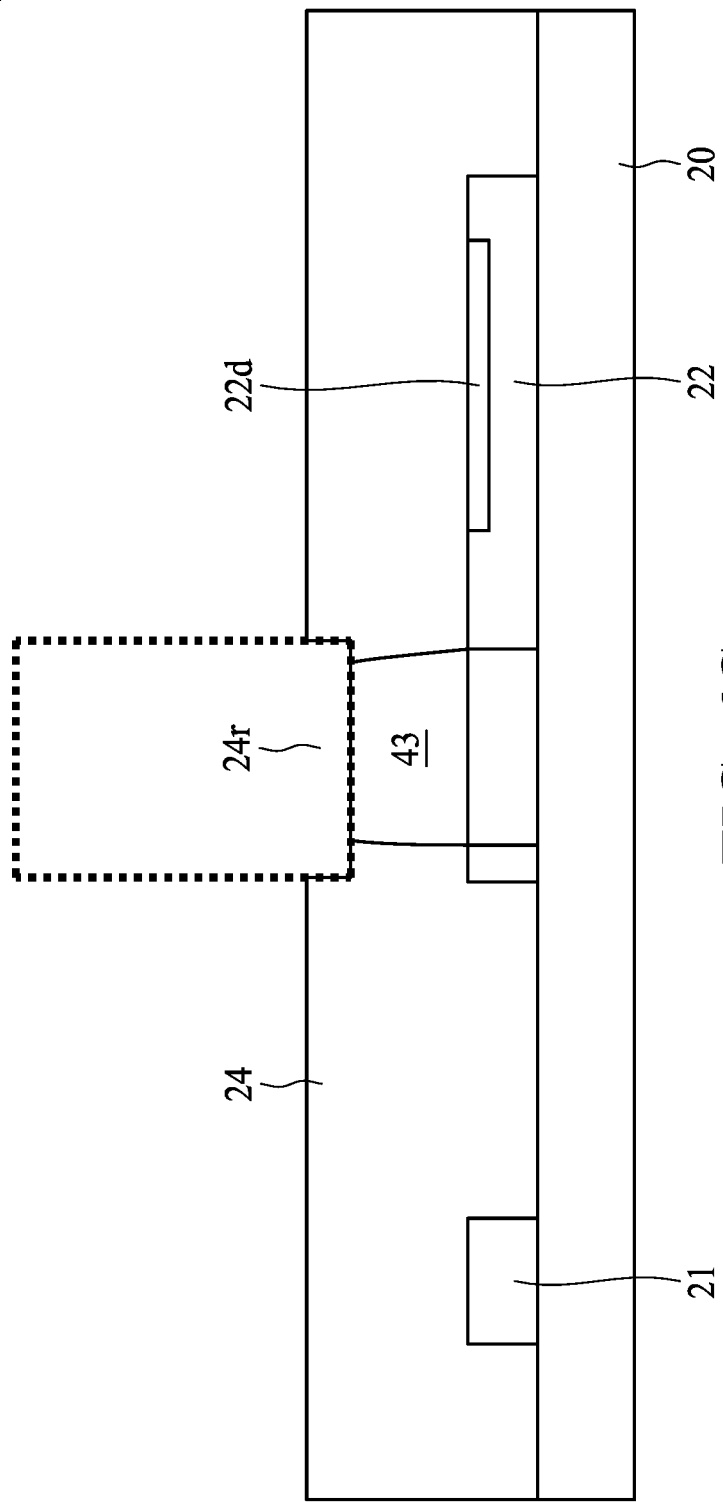

FIG. 6A, FIG. 6B and FIG. 6C illustrate a method of manufacturing an optical system from cross-sectional views in accordance with some embodiments of the present disclosure. FIG. 7A, FIG. 7B, FIG. 7C and FIG. 7D illustrate a method for manufacturing the optical system from perspective views in accordance with some embodiments of the present disclosure. In some embodiments, the method in FIG. 6A, FIG. 6B and FIG. 6C or FIG. 7A, FIG. 7B, FIG. 7C and FIG. 7D are used to manufacture the optical system 4 in FIG. 4.

Figure 7A:
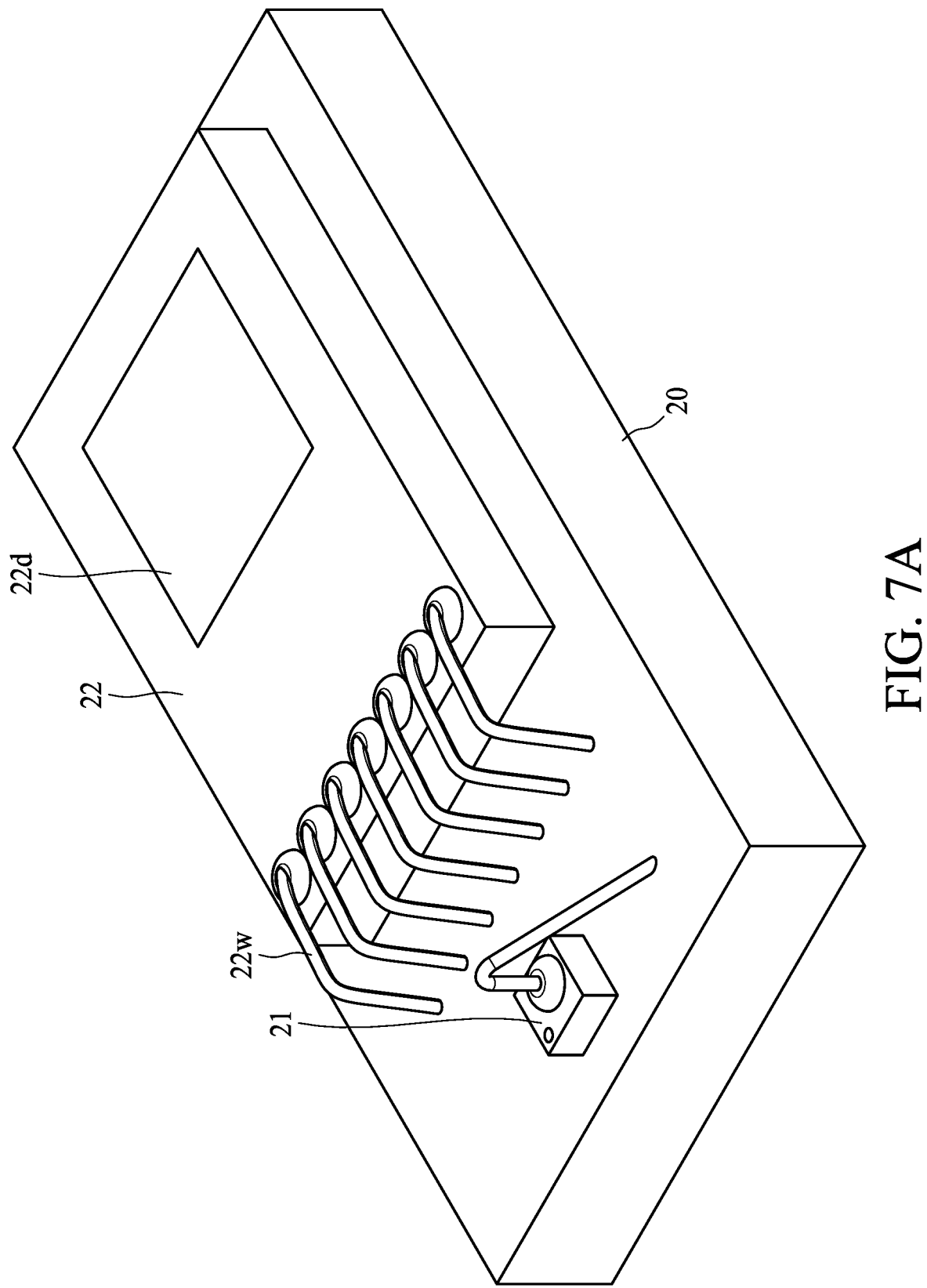
FIG. 7A, FIG. 7B, FIG. 7C and FIG. 7D illustrate a method for manufacturing an optical system in accordance with some embodiments of the present disclosure.
Figure 7B:
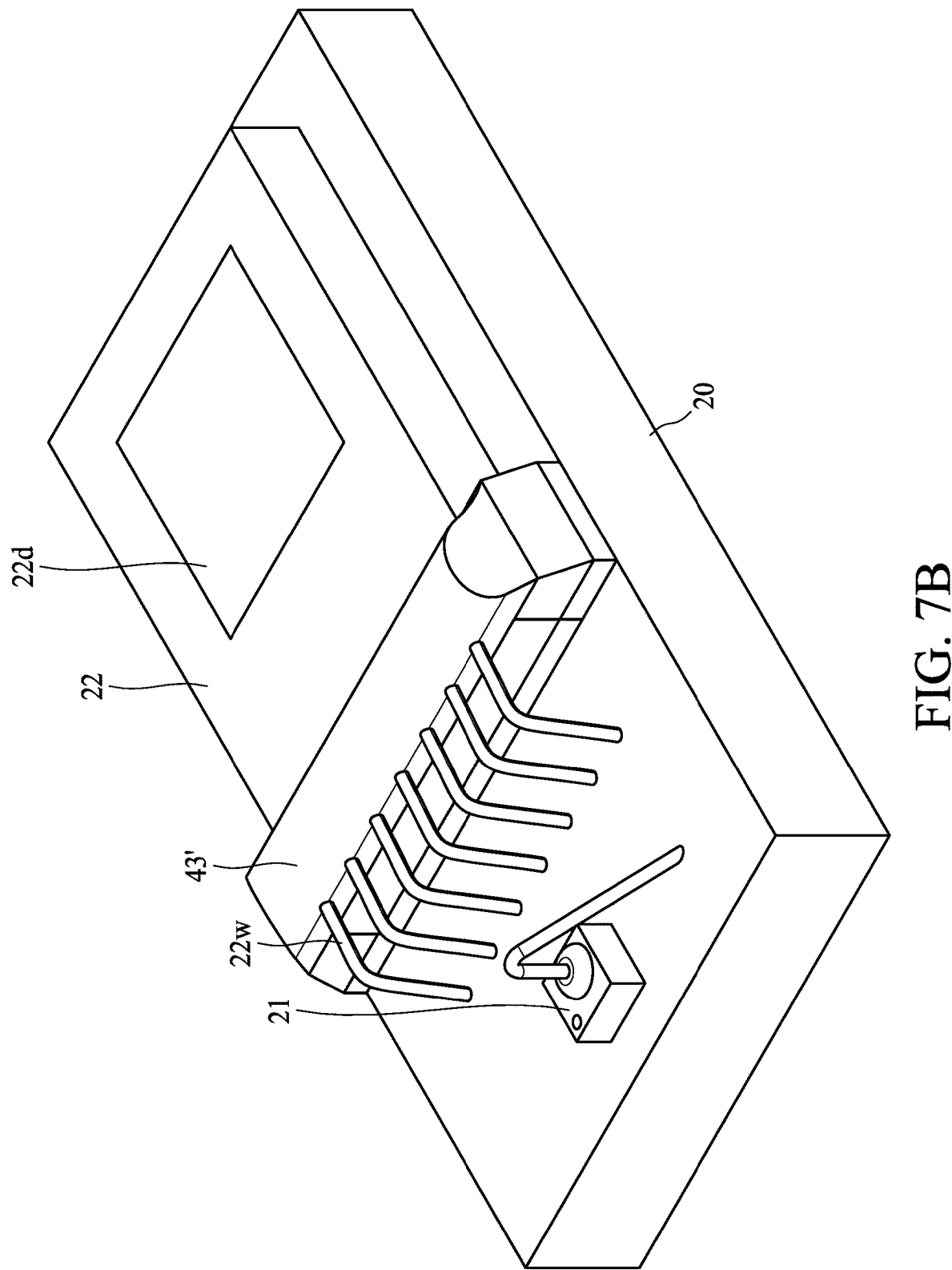

Referring to FIG. 6A or FIG. 7A, a carrier 20 is provided. A light emitter 21 and a light receiver 22 are disposed on the carrier 20 and physically spaced apart from each other. As shown in FIG. 7A, the light receiver 22 is connected to the carrier 20 through bonding wires 22$w$. A block structure 43' is formed on the carrier 20 and across a portion of the light receiver 22 where the light detecting area 22$d$ is not located. In some embodiments, the block structure 43' is disposed across a portion of the bonding wires 22$w$ as shown in FIG. 7B. In some embodiments, the block structure 43' may cover a portion of the sidewall of the light receiver 22. In some embodiments, the block structure 43' can be formed by dispensing opaque materials on the carrier 20 and the portion of the light receiver 22 where the light detecting area 22$d$ is not located. In some embodiments, the block structure 43' includes silicon, epoxy or any other suitable materials (e.g., opaque materials or light absorbing materials). In some embodiments, the block structure 43' is relatively hard. For example, the block structure 43' in FIG. 6A is harder than the block structure 23 in FIG. 5A. For example, the block structure 43' can be formed of a material of Shore C or greater hardness like Shore D90.

Figure 7C:
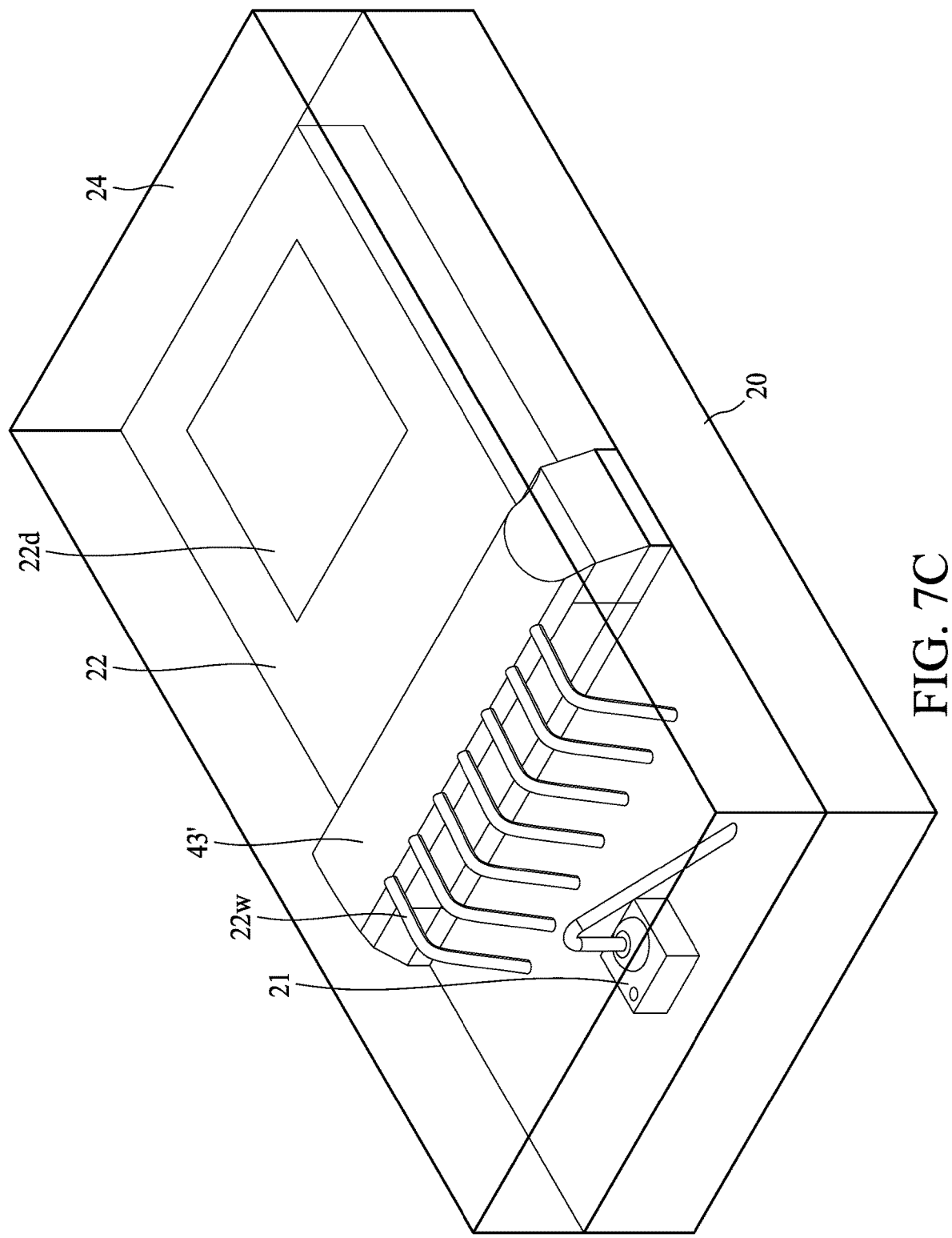

A mold tool 50 with a film 50$f$ then moves toward the carrier 20 to form the encapsulant 24 to cover the light emitter 21, the light receiver 22 and a portion of the block structure 43' to form the optical system as shown in FIG. 6B or FIG. 7C. In some embodiments, the encapsulant 24 is formed by compressive molding process. Since the block structure 43' is relatively hard, the block structure 43' would not be deformed when pressing the mold tool 50 on the block structure 43'. Therefore, as shown in FIG. 6B, the block structure 43' protrudes the top surface of the encapsulant 24. The film 50$f$ is formed of a soft material to provide a buffer for the block structure 43' to avoid crack.

Figure 7D:
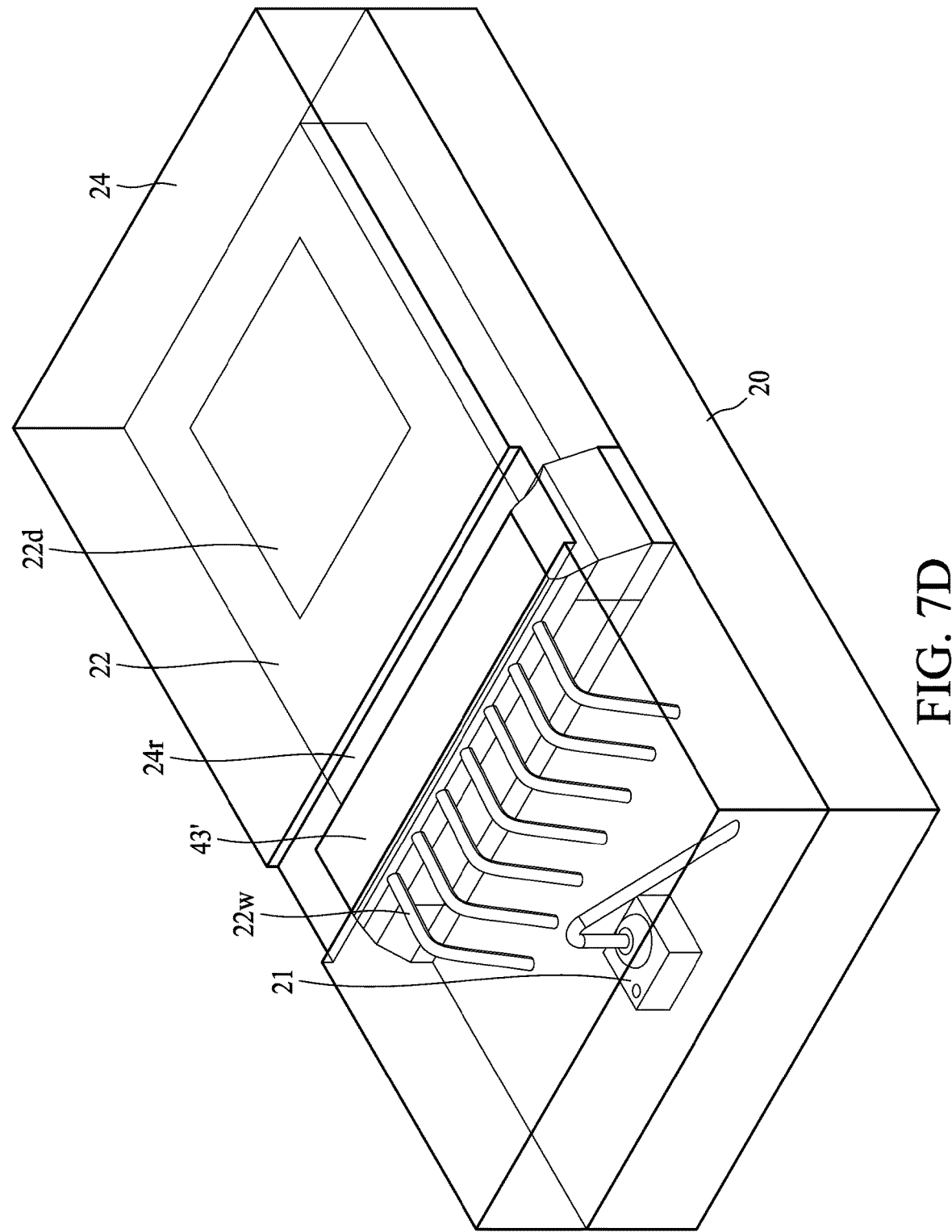

Referring to FIG. 6C or FIG. 7D, a cutting operation (e.g., half cut) is carried out to remove a portion of the block structure 43' and a portion of the encapsulant to form a recess 24$r$. A top surface of the rest portion of the block structure 43 is exposed from the encapsulant 24. For example, the top surface of the encapsulant 24 is higher than the top surface of the block structure 43. For example, the top surface of the block structure 43 is recessed from the top surface of the encapsulant 24.

As used herein, the terms "substantially," "substantial," "approximately," and "about" are used to denote and account for small variations. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. As another example, a thickness of a film or a layer being "substantially uniform" can refer to a standard deviation of less than or equal to ±10% of an average thickness of the film or the layer, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. The term "substantially coplanar" can refer to two surfaces within 50 µm of lying along a same plane, such as within 40 within 30 within 20 within 10 or within 1 µm of lying along the same plane. Two components can be deemed to be "substantially aligned" if, for example, the two components overlap or are within 200 within 150 within 100 within 50 within 40 within 30 within 20 within 10 or within 1 µm of overlapping. Two surfaces or components can be deemed to be "substantially perpendicular" if an angle therebetween is, for example, 90°±10°, such as ±5°, ±4°, ±3°, ±2°, ±1°, ±0.5°, ±0.1°, or ±0.05°. When used in conjunction with an event or circumstance, the terms "substantially," "substantial," "approximately," and "about" can refer to instances in which the event or circumstance occurs precisely, as well as instances in which the event or circumstance occurs to a close approximation.

In the description of some embodiments, a component provided "on" another component can encompass cases where the former component is directly on (e.g., in physical contact with) the latter component, as well as cases where one or more intervening components are located between the former component and the latter component.

Additionally, amounts, ratios, and other numerical values are sometimes presented herein in a range format. It can be understood that such range formats are used for convenience and brevity, and should be understood flexibly to include not only numerical values explicitly specified as limits of a range, but also all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It can be clearly understood by those skilled in the art that various changes may be made, and equivalent elements may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An optical system, comprising:
   a light emitter disposed on a carrier;
   a light receiver disposed on the carrier;
   a block structure configured to mitigate a crosstalk between the light emitter and the light receiver; and
   an encapsulant disposed on the carrier, the light emitter and the light receiver, wherein a portion of the block structure is exposed from the encapsulant and below the encapsulant.

2. The optical system of claim 1, wherein a top surface of the portion of the block structure is lower than a top surface of the encapsulant.

3. The optical system of claim 2, wherein the encapsulant and the top surface of the portion of the block structure define a recess.

4. The optical system of claim 1, wherein a top surface of the block structure has a central portion and a peripheral portion, and the central portion is lower than the peripheral portion.

5. The optical system of claim 1, wherein the block structure further has a curved surface.

6. The optical system of claim 1, wherein a top surface of the portion of the block structure is lower than a top surface of the encapsulant, the top surface of the portion of the block structure has a central portion and a peripheral portion, the central portion of the top surface of the block structure is lower than the peripheral portion of the top surface of the block structure, and the block structure further has a curved surface.

* * * * *